US009710087B1

(12) United States Patent
Jayaraj et al.

(10) Patent No.: US 9,710,087 B1
(45) Date of Patent: Jul. 18, 2017

(54) DISPLAY STACK WITH COMPRESSIBLE CAPACITIVE SENSORS

(71) Applicant: Amazon Technologies, Inc., Seattle, WA (US)

(72) Inventors: Nagendra Bage Jayaraj, Sunnyvale, CA (US); Jung Sik Yang, Cupertino, CA (US); Sukwon Noh, Cupertino, CA (US); Charles Robert Watson, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 14/724,537

(22) Filed: May 28, 2015

(51) Int. Cl.
  *G06F 3/042* (2006.01)
  *G06F 3/041* (2006.01)
  (Continued)

(52) U.S. Cl.
  CPC ........... *G06F 3/0412* (2013.01); *G02B 6/005* (2013.01); *G02B 6/0036* (2013.01); *G02B 6/0065* (2013.01); *G02B 6/0091* (2013.01); *G06F 3/044* (2013.01); *G06F 3/0414* (2013.01); *G09G 3/344* (2013.01); *G09G 3/3473* (2013.01); *G09G 3/36* (2013.01); *G06F 2203/04101* (2013.01); *G06F 2203/04104* (2013.01); *G06F 2203/04106* (2013.01); *G09G 2310/068* (2013.01)

(58) Field of Classification Search
  CPC .... G06F 3/0304; G06F 3/0412; G06F 3/0414; G06F 3/044; G06F 2203/04101; G06F 2203/04104; G06F 2203/04106; G06F 2203/04103; G06F 2203/04105; G06F 1/1652; G06F 1/1647; G02B 6/0065; G02B 6/005; G02B 6/0036; G02B 6/0091; G09G 3/36; G09G 3/344; G09G 3/3473; G09G 2310/068; G09G 2300/023
  See application file for complete search history.

(56) References Cited

U.S. PATENT DOCUMENTS

| 2008/0011944 A1* | 1/2008 | Chua ................ G02B 6/0035 250/227.24 |
| 2010/0053116 A1 | 3/2010 | Daverman et al. |

(Continued)

OTHER PUBLICATIONS

Kim et al., Transparent and Flexible Tactile Sensor for Multi Touch Screen Application With Force Sensing, Jun. 2009, Denver, Colorado.

(Continued)

*Primary Examiner* — Andrew Sasinowski
*Assistant Examiner* — Brent D Castiaux
(74) *Attorney, Agent, or Firm* — Eversheds Sutherland (US) LLP

(57) ABSTRACT

Systems, methods, and computer-readable media are disclosed for ambient light sensing for electronic displays. In one embodiment, a device may include a cover layer, a display, and a capacitive sensor stack positioned in between the cover layer and the display. The capacitive sensor stack may include a first sensor optically coupled to the cover layer, a light guide optically coupled to the first sensor, where the light guide is translucent and compressible, and a second sensor optically coupled to the display and to the light guide. The capacitive sensor stack may be configured to detect a force received at the cover film and to compress in response to the force.

20 Claims, 7 Drawing Sheets

(51) Int. Cl.
   *G06F 3/044*   (2006.01)
   *G09G 3/36*    (2006.01)
   *G09G 3/34*    (2006.01)
   *F21V 8/00*    (2006.01)

(56) References Cited

U.S. PATENT DOCUMENTS

2014/0085213 A1*  3/2014  Huppi .......................... 345/173
2014/0133179 A1*  5/2014  Franklin .............. G02B 6/0093
                                                        362/612

OTHER PUBLICATIONS

Lincoln et al., An optical 3D force sensor for biomedical devices, Jun. 2012, Rome, Italy.
R&D Core Ltd. UK, DRAS: A Flexible Multi-Touch Sensing Technology, Mar. 2014, UK.
R&D Core Ltd. UK, DRAS Technology White Paper, [online], Retrieved from http://rndcore.com/white-papers/DRAS-technology-white-paper.html on Jun. 18, 2015.
Peratech, QTC Material, [online], Retrieved from http://www.peratech.com/qtc-material.html on Jun. 18, 2015.

* cited by examiner

DISPLAY STACK WITH COMPRESSIBLE CAPACITIVE SENSORS

BACKGROUND

A variety of devices, such as electronic book ("e-Book") reader devices, desktop computers, portable computers, smartphones, tablet computers, game consoles, televisions, and so forth are used to access various forms of content. Such devices may respond to user inputs at displays of the device, for example, via touch sensors. However, sensors configured to determine user inputs at a device display may consume valuable space within a device, resulting in thicker and/or larger devices.

Figure 1:
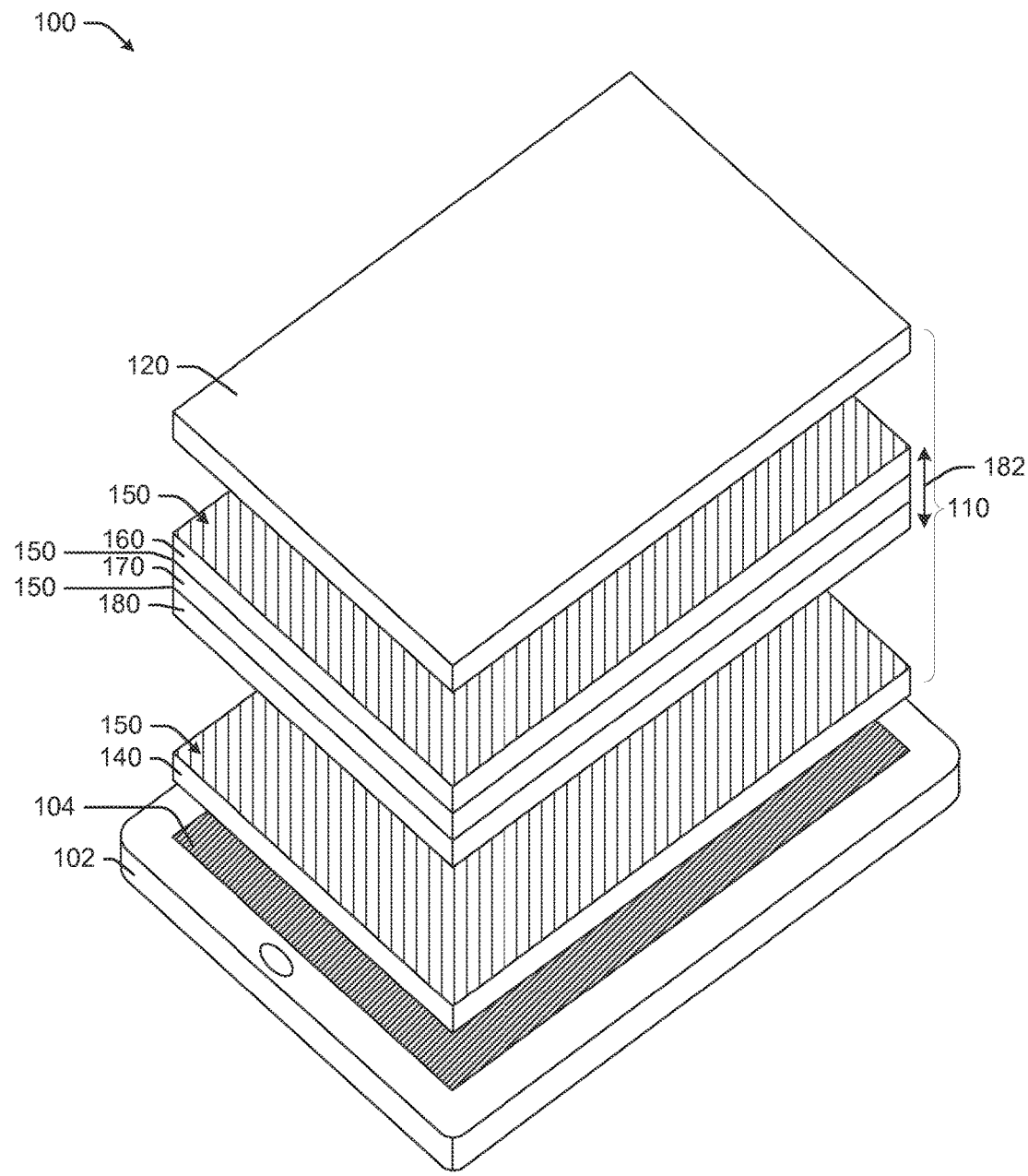
FIG. 1 is a schematic illustration of an exploded view of a display stack with a compressible capacitive sensor in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for integrating light guides into compressive capacitive sensors of a display stack. By integrating light guides, overall display stack thickness may be reduced, resulting in thinner or less thick devices that incorporate display stacks of the disclosure. Embodiments of the disclosure may include force sensitive capacitive sensor stacks as part of display stacks that detect and/or measure force applied at the display stack. Some embodiments may include capacitive sensor stacks that compress or otherwise flex in response to pressure applied at the display stack. Example embodiments of the disclosure may integrate light guides into compressible and optically clear layers of a capacitive sensor stack. The display stacks with compressible capacitive sensors having integrated light guides may result in thinner device profiles and improved durability by reducing a number of components, adhesives, or other materials used in display stacks.

Example embodiments of the disclosure relate to systems, methods, computer-readable media, techniques, and methodologies of producing display stacks with force sensitive capacitive sensor stacks that are configured to determine, measure, and/or respond to a force, such as a user input, at the display stack by having a compressible layer of the force sensitive capacitive sensor stack serve as a light guide of the display stack. In one specific example, the light guide forming a compressible layer of the force sensitive capacitive sensor stack may include or be formed from optically clear silicon.

A variety of devices, such as electronic book ("e-Book") reader devices, desktop computers, portable computers, smartphones, tablet computers, televisions, wearable devices, and so forth are used to access various forms of content and other information. Such devices may include displays that are used to present information or content to users. Such displays may be emissive, reflective, or a combination thereof. An emissive display emits light to form an image. Emissive displays include, but are not limited to, backlit liquid crystal displays, organic light emitting diode displays, plasma displays, cathode ray tubes, light-emitting diodes, image projectors, and so forth. Reflective displays use incident light to form an image. Incident light may be provided, for example, by the sun, general illumination in a room or environment, a reading light, a front light, and so forth. Reflective displays include, but are not limited to, electrophoretic displays, interferometric displays, electrowetting, cholesteric displays, and so forth.

Displays of devices may be configured to receive user inputs. For example, a user may be able to input information or indicate a selection to the device via one or more sensors associated with a display of the device, such as a touch sensor associated with a touchscreen of a device. Another example of displays that may be configured to receive user inputs includes force or pressure sensitive displays or display stacks that may be responsive to a force or pressure input at the display. Embodiments described herein may include capacitive sensor stacks configured to receive user inputs, such as a force, at a display or display stack with a compressible layer that also serves as a light guide, for example, in a front lit display. Compressible layers may be layers that compress, deform, deflect, or otherwise at least partially shift in response to pressure received or applied at a surface of the compressible layer. Light guides, as described herein, may be facilitated to guide light in order to generate images or information on the device display. In some instances, light guides may be coupled to illumination sources that emit light. Where an illumination source is used, such as in a backlit liquid crystal display ("LCD") or a frontlit electrophoretic display ("EPD"), the capacitive sensor stack may include the light guide as part of a compressive layer, thereby reducing an overall thickness of the display stack.

Certain embodiments of the disclosure include display stacks with compressive capacitive sensors. The compressive capacitive sensors or sensor stacks described herein may be configured to detect a force and/or compress in response to the force. One or more layers of the compressive capacitive sensors may be a light guide configured to direct light through the one or more layers. Some or all of the components or layers of the display stacks described herein may be coupled to each other with optically clear adhesives, such as a liquid or tape optically clear adhesive. The display stack may include certain components, such as a cover layer or cover film, one or more adhesive layers, and other components.

Referring to FIG. 1, an example user device 100 with a display stack 110 is partially depicted in exploded view in accordance with one or more embodiments of the disclosure. The user device 100 may include a housing 102 with an opening 104 in which a portion of or the entire display stack 110 may be positioned. The device 100 may comprise an e-Book reader device, a computer display, a portable computer, a smartphone, a tablet computer, a game console, a television, an in-vehicle display, and so forth. The display stack 110 may form an outer display of the user device 100 and may be configured to present information to, or receive inputs from a user of the user device 100. In one example, the display stack 110 may form a touchscreen of the user device 100, where a user may touch or press a portion of the display stack 110 to make a selection or another input.

The display stack 110 may include a cover layer 120, a capacitive sensor stack 130, and a display 140. The capacitive sensor stack 130 may be positioned in between the cover layer 120 and the display 140. One or more of the cover layer 120, capacitive sensor stack 130, and/or display 140 may have the same or different dimensions, including length, width, or thickness. In one embodiment, each component other than the cover layer 120 may have the same length and width. The cover layer 120 may be optically coupled to the capacitive sensor stack 130 with an optically clear adhesive 150. The optically clear adhesive 150 may form a layer and may cover a portion of or all of the interface between a surface (e.g., a "bottom" surface) of the cover layer 120 and a surface (e.g., a "top" surface) of the capacitive sensor stack 130. References to "bottom," "top," or other surfaces are only for description and are not absolute positions. Although some surfaces may be referred to as "top," "bottom," "side," or "edge" surfaces herein, relative positioning may be affected by an orientation of the display stack or user device including the display stack 110. The optically clear adhesive 150 may have a thickness of about 0.05 millimeter (mm) to about 0.1 mm or 0.2 mm. Similarly, the display 140 may be optically coupled to an opposite side or surface (e.g., "bottom" surface) of the capacitive sensor stack 130 with the optically clear adhesive 150. In some embodiments, different types of, or different forms of, optically clear adhesive may be used to couple one or more components of the display stack 110, although illustrated in FIG. 1 as optically clear adhesive 150. For example, a liquid optically clear adhesive may be used to couple a first pair of layers of the display stack 110, while a tape-form optically clear adhesive may be used to couple a different pair of layers of the display stack 110. In another example, ultraviolet cured, laminated, or temperature cured adhesives may be used in some or all layers of the display stack 110. The optically clear adhesive 150 may improve optical characteristics of the device, as well as durability. Liquid optically clear adhesives may be malleable and/or less firm than other adhesives, and may therefore bind to non-even surfaces. Non-liquid optically clear adhesives, such as optically clear adhesive tape, may be used to bind one or more layers of the display stack 110 together. For example, the cover layer 120 may be coupled to the capacitive sensor stack 130 with a tape-form optically clear adhesive. Optically clear adhesive may be cured via ultraviolet light, heat, moisture, or a combination thereof. Optically clear adhesive may also reduce or eliminate an air gap between components or layers of the display stack 110. Other embodiments of the display stack may include additional, fewer, or different, components.

The cover layer 120 may be any suitable cover layer configured to be mounted, coupled, or adhered to the capacitive sensor stack 130. For example, the cover layer 120 may be a cover film. The cover layer 120 may be optically clear. The cover layer 120 may be formed from materials such as plastics including polycarbonate, polyethylene terephthalate, polysulfone, or other plastics. In some embodiments, the cover layer 120 may be formed from materials including glass, sapphire, or another suitable material. The cover layer 120 may be flexible or resilient in some embodiments, while in other embodiments, the cover layer 120 may be rigid. For instance, the cover layer 120 may be a flexible plastic or glass cover film, or a rigid plastic or glass cover layer. In some embodiments the cover layer 120 may be dimensioned slightly larger than other components of the display stack 110 and may be configured to secure the display stack 110 to the user device 100. The cover layer 120 may have a thickness ranging from about 0.1 mm to about 0.2 mm or 0.3 mm in some embodiments. The cover layer 120 may form an outer or outermost layer of the display stack 110. The cover layer 120 may have a uniform or constant thickness or a variable thickness. In some embodiments, the cover layer 120 may form a top most layer of not only the display stack 110, but of the device that includes the display stack 110.

The capacitive sensor stack 130 may be a force sensitive capacitive sensor stack and may include one or more components. The capacitive sensor stack 130 may be optically clear. The capacitive sensor stack 130 may be configured to detect a force, such as a user input applied at a surface of the display stack 110. In some embodiments, the capacitive sensor stack 130 may be compressible or compressive, and may compress locally in response to force or pressure applied at a surface of the display stack 110 or capacitive sensor stack 130. The capacitive sensor stack 130 may be configured to sense force in, for example, three axes or axial directions based at least in part on a measurement of a capacitance change induced upon the capacitive sensor stack 130. The capacitive sensor stack 130 may have a total thickness 182 of about 0.1 mm to about 0.8 mm or 1.0 mm, depending on a structure of the capacitive sensor stack 130 and/or materials and components forming the capacitive sensor stack 130. For example, embodiments that include optically clear adhesive to couple the force sensors to the light guide may be thicker than embodiments where force sensors are printed directly on the light guide. The capacitive sensor stack 130 may detect or measure a force or pressure applied at the cover layer 120 via the compressible light guide layer 170 and the first and second sensor layers 160, 180.

In FIG. 1, the capacitive sensor stack 130 includes a first sensor layer 160, a light guide layer 170, and a second sensor layer 180. Other embodiments may include additional or fewer components. The first sensor layer 160 and/or the second sensor layer 180 may be force sensitive capacitive sensor layers. The first sensor layer 160 and/or the second sensor layer 180 may be force sensors configured to measure a force applied at the cover layer 120 and measured between the cover layer 120 and the display 140. The first sensor layer 160 and/or the second sensor layer 180 may include silver nanowire mesh, indium tin oxide, or another material arranged in any number of configurations, such as serpentine, parallel, diamond, or another configuration. The first sensor layer 160 and/or the second sensor layer 180 may be configured to detect or measure a relative change in force or applied load, a rate of change in force, contact and/or touch, a force threshold and, in some instances trigger an action in response to the force threshold, among other functions. The first sensor layer 160 and/or the second sensor layer 180 may be configured to sense resistance in an electrical circuit in order to determine force. In some embodiments, one or both of the first sensor layer 160 and/or the second sensor layer 180 may be optically coupled to the light guide layer 170, for example, via the optically clear adhesive 150 or another optically clear adhesive. In other embodiments, the first sensor layer 160 and/or the second sensor layer 180 may be printed directly on the light guide layer 170, which may reduce the total thickness 182 of the capacitive sensor stack 130, as well as an overall thickness of the display stack 110. The first sensor layer 160 and the second sensor layer 180 may include resistive and/or capacitive sensors and may be formed from any suitable material configured to detect touch input, such as a capacitive layer, an indium tin oxide coating or layer, a conductive layer, or another material. The first sensor layer 160 and the second sensor layer 180 may be coupled to or adhered to the cover layer 120 and/or display 140 via an adhesive that covers all of or a portion of the respective first sensor layer 160 and the second sensor layer 180.

The light guide layer 170 may be a compressive/compression layer that is compressible or tends to compress in response to force or pressure. The light guide layer 170 may plastically and/or elastically deform in response to pressure applied at or received at the light guide layer 170. In some embodiments, the light guide layer 170 may have a hardness value that reflects the plastic deformation the light guide layer 170 may withstand. For example, the light guide layer 170 may have a durometer value of 20 Shore A hardness, or about 80 Shore A hardness, or another durometer value between about 20 Shore A hardness and about 80 Shore A hardness. In other embodiments, the light guide layer 170 may have a similar range of compression ratios on an alternate hardness scale. The light guide layer 170 may be optically clear, transparent, or translucent. In some embodiments, the light guide layer 170 may be partially transparent instead of fully transparent, or may be partially translucent to avoid hot spotting, or high intensity light discharge at a local area of the light guide layer 170. For example, the light guide layer may have a translucency or transmittance range of equal to or greater than about 85%, such as about 87% or 90%.

In one example, the light guide layer 170 may be formed from optically clear silicon, optically clear thermoplastic elastomers, optically clear thermoplastic polyurethane, or another optically clear elastomer. The light guide layer 170 may be positioned in between the first sensor layer 160 and the second sensor layer 180. In some embodiments, as described herein, the light guide layer 170 may have one or more surface features or a textured surface or textured surface portion configured to facilitate light propagation through the display stack 110. For example, the "top" surface, as illustrated in FIG. 1 may have raised protrusions. In some embodiments, the light guide layer 170 may also include surface features or textured portions on an opposite, or "bottom," side of the light guide layer 170 to facilitate light propagation. Surface features may be formed during an injection molding process or compressible molding process, or during manufacture. In other embodiments, surface features may be formed by post pattern processing, such as via laser etching, photolithography, or other techniques. The light guide layer 170 may further include a material suspended within the light guide layer 170. Suspended materials may affect reflectivity of the light guide panel 170.

The light guide layer 170 may be configured to direct light along a planar surface. In some implementations, the light guide layer 170 may be used to frontlight a reflective display by directing at least a portion of light from one or more illuminators onto a portion of the reflective display. The light guide layer 170 may be coupled to one or more components of the display stack 110.

The first sensor layer 160 may be coupled to or positioned at a surface of the light guide layer 170. The second sensor layer 180 may be coupled to or positioned at an opposite surface of the light guide layer 170. The first sensor layer 160 and/or the second sensor layer 180 may cover all or a portion of the respective surfaces of the light guide layer 170.

The capacitive sensor stack 130 may be coupled to the display 140. In FIG. 1, the second sensor layer 180 is coupled to the display 140 with the optically clear adhesive 150. The display 140 may be any suitable display, such as an electrophoretic display, a liquid crystal display, or another type of display. The display 140 may form a bottom layer, or an outer layer, of the display stack 110.

One or more of the layers of the display stack 110 may be joined together or otherwise coupled using one or more adhesives, such as an optically clear adhesive liquid or tape. Other embodiments may include additional or fewer components in a display stack or may have components in different positions. For example, other embodiments may not include the optically clear adhesive 150, or may have additional material between the cover layer 120 and the display 140, or other components.

With the configuration illustrated in FIG. 1, the light guide layer 170 acts not only as a compression layer of the capacitive sensor stack 130, but also as a light guide to direct light through the display stack 110, removing the need for a separate light guide that consumes valuable space in the device 100.

Accordingly, the systems, methods, computer-readable media, techniques, and methodologies described herein may integrate light guides into compressive capacitive sensors of a display stack. By integrating light guides, overall display stack thickness may be reduced, resulting in thinner or less thick devices that incorporate display stacks of the disclosure. Although discussed herein in the context of e-readers and force sensitive capacitive sensors, the systems, methods, and apparatuses of the disclosure may be applicable to other electronic devices and sensors.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. The techniques are described below with reference to the following devices and processes. However, a number of other devices may also employ these techniques. While FIG. 1 illustrates one example display stack, multiple other forms of display stacks, devices, and architectures may be included in other embodiments.

Illustrative Embodiments and Processes

Figure 2:
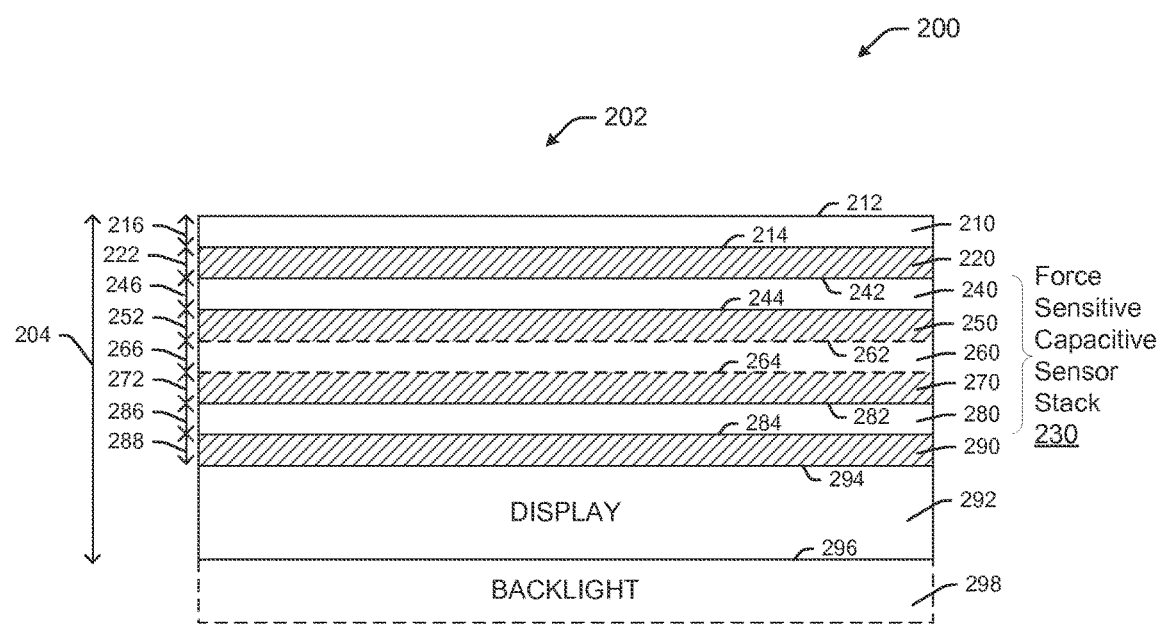
FIG. 2 is a schematic illustration of a cross-sectional view of a display stack with a compressible capacitive sensor in accordance with one or more embodiments of the disclosure.
Figure 3:
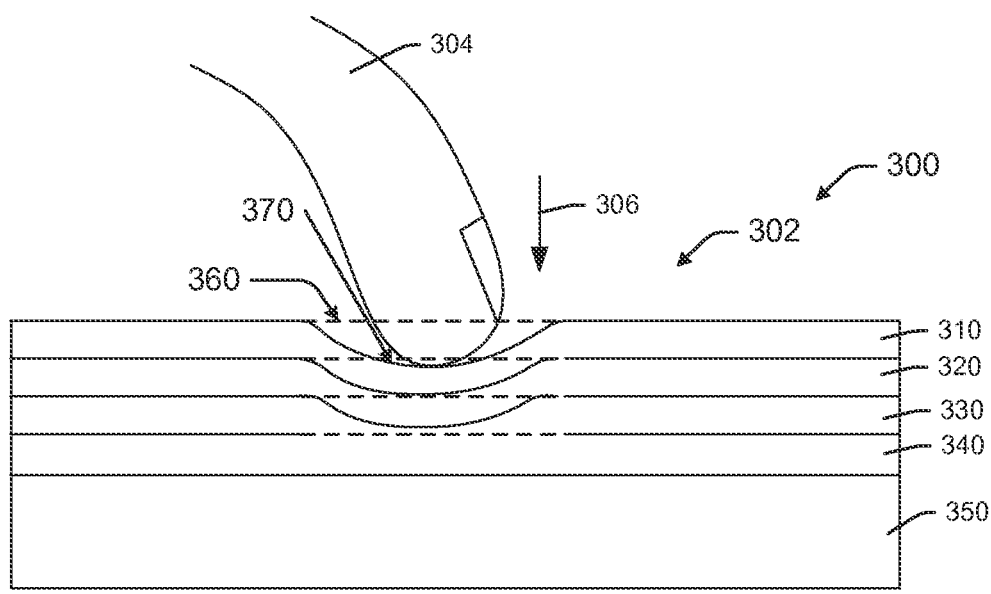
FIG. 3 is a schematic illustration of the display stack of FIG. 2 is a partially compressed position in accordance with one or more embodiments of the disclosure.

FIG. 2 illustrates another embodiment of a display stack 200 in cross-sectional view in accordance with one or more embodiments of the disclosure. FIG. 2 depicts the display stack 200 in an uncompressed position 202 while FIG. 3 depicts a display stack 300 in a compressed position 302. The display stack 200 may be the same as or different than the display stack 110 of FIG. 1.

Referring first to FIG. 1, the display stack 200 may include a cover layer 210 optically coupled to a capacitive sensor stack 230 via a first adhesive layer 220. The display stack 200 includes a display 292 optically coupled to the capacitive sensor stack 230 via a second adhesive layer 290. The second adhesive layer 290 may be formed from the same adhesive as the first adhesive layer 220, or another adhesive. The display stack 200 may be optionally optically coupled to a backlight 298 in embodiments where the display 292 is a backlit display.

The cover layer 210 may be a cover layer that forms an outermost layer of the display stack 200 and/or protects the display stack 200. A user may interact with the cover layer 210 in making selections or user inputs at a device that includes the display stack 200. In one example, the cover layer 210 is a cover film. The cover layer 210 may be flexible or rigid. The cover layer 210 may be formed from plastic, glass, or another suitable material. The cover layer 210 may include a top surface 212 that is exposed to an ambient environment and an opposing bottom surface 214. The top surface 212 and the bottom surface 214 may be substantially planar and, in some embodiments, may be substantially parallel. The cover layer 210 may have a cover thickness 216. The cover thickness 216 may be about 0.2 mm. The cover layer 210 may be optically clear. In some embodiments, the cover layer 210 may include an anti-glare coating or other surface modifications. The cover layer 210 may be optically coupled to the capacitive sensor stack 230 via the first adhesive layer 220. Specifically, the bottom surface 214 may be optically coupled to a top surface of the capacitive sensor stack 230, such as an upper first sensor surface 242 of a top sensor 240 of the capacitive sensor stack 230. The first adhesive layer 220 may have a thickness of about 0.1 mm, or about 25-50 microns.

The capacitive sensor stack 230 may be a force sensitive capacitive sensor stack configured to detect or measure a force or pressure applied at the display stack 200. The capacitive sensor stack 230 may compress in response to force or pressure applied at the display stack 200. In some embodiments, the capacitive sensor stack 230 may be configured to detect or measure multi-finger or multiple input pressures. The force sensitive capacitive stack may include one or more laminated components and may be configured to detect or measure a change in capacitance. The capacitive sensor stack 230 may be positioned in between the cover layer 210 and the display 292.

The capacitive sensor stack 230 may include the top sensor 240, a force sensitive compression layer 260, and a bottom sensor 280. Although described as "top" or "bottom" sensors, the sensors may have any orientation. The top sensor 240 may include the upper first sensor surface 242 and an opposing lower first sensor surface 244. The upper first sensor surface 242 may be optically coupled to the cover layer 210 via the first adhesive layer 220. The upper first sensor surface 242 may be spaced apart from the lower first sensor surface 244 by a top sensor thickness 246 of the top sensor 240. The top sensor thickness 246 may be about 0.2 mm.

The top sensor 240 may be optically coupled to the force sensitive compression layer 260 via a second adhesive layer 250. Specifically, the lower first sensor surface 244 may be optically coupled to an upper force sensitive compression layer surface 262 of the force sensitive compression layer 260. The second adhesive layer 250 may have a thickness 252 and may be the same adhesive as the first adhesive layer 220 or another adhesive, and may have a different thickness than the thickness 222 of the first adhesive layer 220. In some embodiments, the top sensor 240 may be printed on the force sensitive compression layer 260, which may remove or reduce the second adhesive layer 250.

The force sensitive compression layer 260 may have the upper force sensitive compression layer surface 262 spaced apart from an opposing lower force sensitive compression layer surface 264 by a compression layer thickness 266. The compression layer thickness 266 may be about 0.2 mm to about 0.5 mm. In some embodiments, the compression layer thickness 266 may be configured such that the force sensitive compression layer 260 is thick enough to avoid complete compression when a force is applied at the cover layer 210, so as to avoid interrupting light propagating through the force sensitive compression layer 260.

The force sensitive compression layer 260 may be optically clear and may be compressible. The force sensitive compression layer 260 may be formed from optically clear silicon or another dielectric material. For example, the force sensitive compression layer 260 may include a dielectric optically clear adhesive. The force sensitive compression layer 260 may serve as a light guide in some embodiments, such as embodiments with frontlit displays. The force sensitive compression layer 260 may be optically coupled to the bottom sensor 280. In FIG. 2, the lower force sensitive compression layer surface 264 is coupled to an upper second sensor surface 282 of the bottom sensor 280 via a third adhesive layer 270. The third adhesive layer 270 may have a thickness 272 and may be the same adhesive as the first adhesive layer 220, the second adhesive layer 250, or another adhesive, and may have a different thickness than the thickness 222 of the first adhesive layer 220 or thickness 252 of the second adhesive layer 250. In some embodiments, the bottom sensor 280 may be printed on the force sensitive compression layer 260, which may remove or reduce the third adhesive layer 270. The force sensitive compression layer 260 may be substantially planar and, in some embodiments, may be formed of one or more materials such as plastic, aerogel, and so forth. The force sensitive compression layer 260 may be laminated to the display 292.

The bottom sensor 280 may include the upper second sensor surface 282 and an opposing lower second sensor surface 284. The upper second sensor surface 282 may be optically coupled to the force sensitive compression layer 260 via the third adhesive layer 270. The upper second sensor surface 282 may be spaced apart from the lower second sensor surface 284 by a bottom sensor thickness 286 of the bottom sensor 280. The bottom sensor thickness 286 may be about 0.2 mm. The bottom sensor 280 may be the same type of sensor as the top sensor 240. The lower second sensor surface 284 of the bottom sensor 280 may be optically coupled to a front surface 294 of the display 292 via a fourth adhesive layer 290. The fourth adhesive layer 290 may be formed from the same adhesive, or a different adhesive, as any of the first, second, or third adhesive layers, 220, 250, 270, and may have the same or different thickness 288 as any of the first, second, or third adhesive layers, 220, 250, 270.

The display stack 200 may have an overall thickness 204 that includes thicknesses of one or more components included in the display stack 200. The overall thickness 204 may range from about 0.3 mm, to about 0.5 mm, to about 0.8 mm, to about 1.0 mm, to about 1.1 mm, or to about 1.5 mm, or may be another thickness between about 0.3 mm to about 2.0 mm.

The display stack 200 may be optically coupled to the display 292. The display 292 may include the front surface 294 that is coupled to the bottom sensor 280 via the fourth adhesive layer 290, and a back surface 296. In some embodiments, the backlight 298 may be coupled to the display 292 at the back surface 296. Other embodiments may not include the backlight 298. The display 298 which may be configured to present visual information to a user. The display 298 may be emissive or reflective. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, a frontlight, and so forth. Reflective displays include electro-optical displays such as electrophoretic displays, cholesteric displays, electrowetting, and so forth, as well as interferometric and other displays. For example, the electrophoretic displays may comprise an electrophoretic material configured such that when electricity is applied an image may be formed. The display 298 may be configured to present images in monochrome, color, or both. In some implementations, the display may use emissive, reflective, or combination displays with emissive and reflective elements.

Referring to FIG. 3, a display stack 300 is depicted in a compressed position 302. The display stack 300 may be the display stack 200 of FIG. 2, or may be another display stack in accordance with one or more embodiments described herein. For example, the display stack 300 may include one or more laminated layers, or may not include adhesive layers. In FIG. 3, the display stack 300 may receive a force or pressure, for example, by a user's finger 304 that applies pressure or force in direction 306. In one example, the user may apply the force to make a selection or other user input at a device including the display stack 300.

The display stack 300 may include a cover film 310 laminated to a first sensor 320 of a capacitive sensor stack that includes a compressive light guide 330, upon which the first sensor 330 is mounted or coupled on a surface of, and a second sensor 340 positioned on an opposite side surface of the light guide 330 than the first sensor 320. The display stack 300 may include a display 350 upon which the second sensor 340 of the capacitive sensor stack is laminated. Alternatively, one or more of the layers or components of the display stack 300 may be coupled via an adhesive, as described herein.

Upon receiving the force or pressure applied at the cover film 310 by the user's finger 304, the cover film 310 may deflect from a first position 360, or an uncompressed position, to a second position 370, or a compressed position. In deflecting from the first position 360 to the second position 370 under the force in direction 306, the first sensor 300 and the second sensor 340 may measure a change in capacitance to determine that a force is applied at an area local to the user's finger, and in some embodiments, may also determine an amount of pressure or force applied at the cover film 310 or the display stack 300 by the user's finger 304. While illustrated as some layers of the display stack 300 shifting or deflecting, in some embodiments some or all of the layers of the display stack 300 may shift, flex, or deflect, while some layers may remain fixed or unflexed. In some embodiments, only the cover film 310, the first sensor 320, and the compressive light guide 330 may compress, such that the first sensor 330 comes into contact with, or otherwise gets closer to (but does not contact) the second sensor 340. Accordingly, the display stack 300 may detect, determine, or measure the force applied at the display stack 300.

Figure 4:
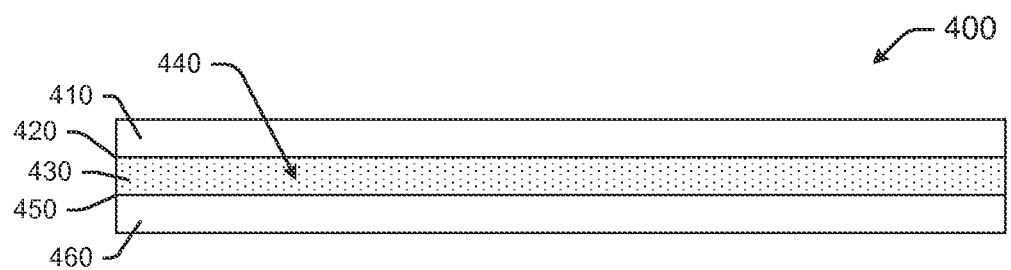
FIG. 4 is a schematic illustration of a cross-sectional view of a compressible capacitive sensor with a suspended material in accordance with one or more embodiments of the disclosure.

FIG. 4 depicts another embodiment of a capacitive sensor stack 400 in accordance with one or more embodiments of the disclosure. In some instances, a compressive layer of a capacitive sensor stack as described herein may be thin enough that a force applied at a cover layer of a display stack may result in interruption of light propagating through the compressive layer. In order to avoid disruption of light propagation through the compressive layer, or to avoid any other interruption, embodiments of the disclosure may include a material that is suspended within or otherwise dispersed within the compressive layer to maintain or enhance a reflectivity of the display stack or to otherwise improve optical properties of the display stack.

In FIG. 4, the example capacitive sensor stack 400 includes a first sensor 410, a compressive layer 430 with a suspended material 440 within the compressive layer 430, and a second sensor 460 opposite the first sensor 410. The first sensor 410 may be printed on the compressive layer 430 at a first interface 420, and the second sensor 460 may be printed on the compressive layer 430 at a second interface 450. The compressive layer 430 may be optically clear and compressible. The suspended material 440 may reflect light propagating through a light guide, which may be the compressive layer 430. The compressive layer 430 may be formed entirely from, or partially from, optically clear silicon with the suspended material 440 distributed across a thickness of the compressive layer 430. The suspended material 440 may be dispersed within the optically clear silicon of the compressive layer 430, such that the suspended material reflects light propagating through the clear and compressible light guide layer or compressive layer 430. In some embodiments, the suspended material 440 may be chemical or physical structures that are configured to direct light propagating through the compressive layer 430. In some embodiments, or in addition to the suspended material 440 of FIG. 4, display stacks as described herein may use staggered outcoupling or staggered two-sided illumination instead of suspended materials to ensure light guide illumination.

Figure 5:
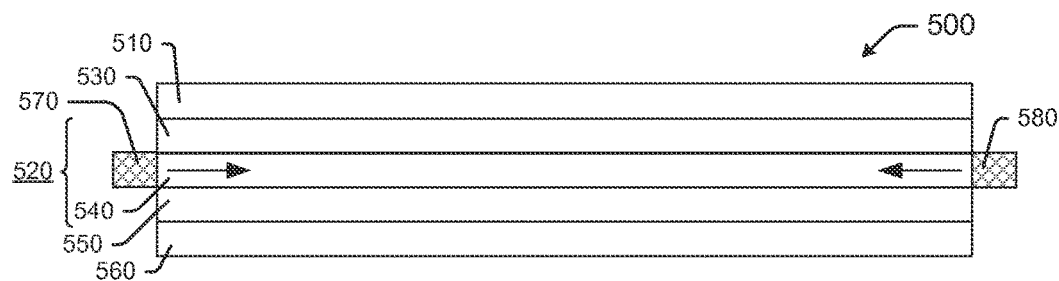
FIG. 5 is a schematic illustration of a cross-sectional side view of a display stack with illuminators in accordance with one or more embodiments of the disclosure.
Figure 6:
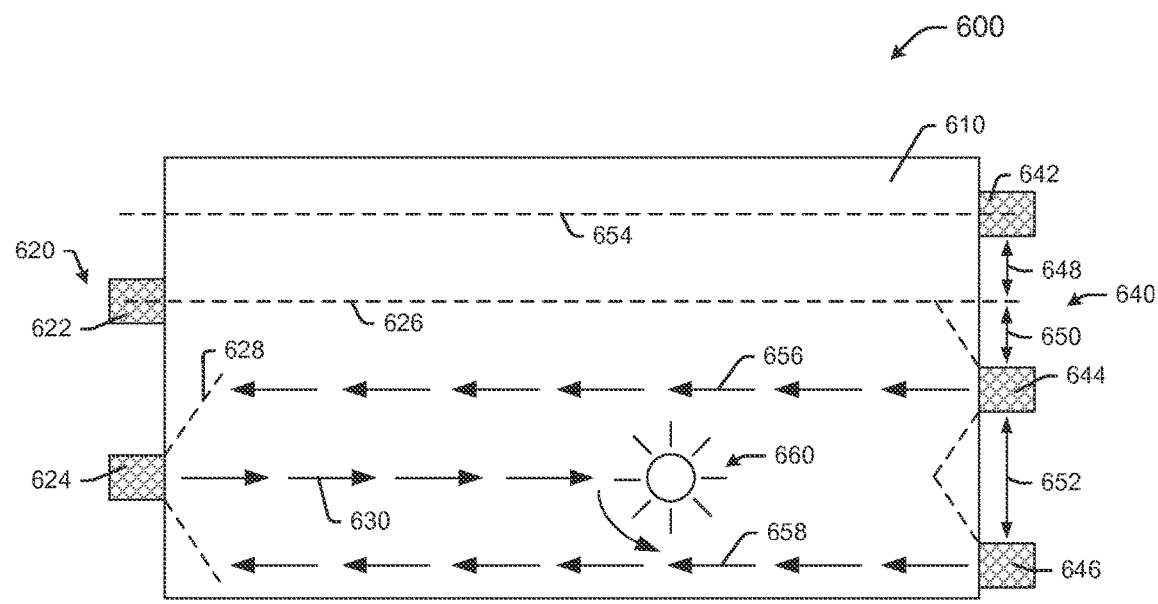
FIG. 6 is a schematic illustration of a top view of a light guide with illuminators in accordance with one or more embodiments of the disclosure.

Referring to FIGS. 5 and 6, another embodiment of a display stack 500 is illustrated with illuminators in cross-sectional view in FIG. 5, in accordance with one or more embodiments of the disclosure. The display stack 500 may include a cover layer 510, and a force sensor stack 520 that includes a first sensor 530, a light guide 540, and a second sensor 550. The display stack 500 may include a display 560, such as an e-ink or electrophoretic display. The display stack 500 may be part of a frontlit display. The display stack 500 may include one or more illuminators 570 positioned on a first side of the display stack 500. In some embodiments, such as in display stack 500, one or more illuminators 580 may also be positioned on a second side of the display stack 500 opposite the first side. The illuminators 570, 580 may be configured to emit light or to direct light through the light guide 540.

Referring to FIG. 6, a light guide 600 in accordance with one or more embodiments of the disclosure is depicted in a top view. The light guide 600 may be the light guide 540 of the display stack 500 of FIG. 5. The light guide 600 may be substantially planar and rectangular in geometry. The light guide 600 may have a perimeter around which one or more edge surfaces interface with a first surface 610, which may be a top surface, of the light guide 600. In some embodiments, such as the embodiment of FIG. 6, one or more illuminators may be positioned about edge surfaces of the light guide 600 to facilitate lighting of the light guide 600. The light guide 600 may be optically coupled to the one or more illuminators and may be configured to distribute at least a portion of light emitted from one or more illuminators to a front side or front surface of a display. The one or more illuminators may be configured to emit light when activated. The light emitted may comprise photons in infrared wavelengths, visible wavelengths, ultraviolet wavelengths, or a combination thereof. Each illuminator may include one or more light-emitting diodes ("LED"), cold cathode fluorescent lamp ("CCFL"), electroluminescent materials, sonoluminescent materials, fluorescent lights, incandescent lights, or a combination thereof. In some implementations, different types of illuminators may be coupled to the light guide 600. For example, electroluminescent lights may be used in conjunction with LEDs. The one or more illuminators may be arranged along one or more edge surfaces of the light guide 600.

The one or more illuminators 570, 580 illustrated in FIG. 5 may be optically coupled to the light guide 540 via an optical coupling that may include one or more of physical proximity, an air gap, an adhesive, a mechanical interface, and so forth. In some implementations, one or more surface features may be provided on one or more of the respective illuminators. These surface features, such as diffusers, grooves, grating, dimples, lenses, planar surfaces, concave surfaces, convex surfaces, and so forth, may be used to enhance or attenuate the transmission of light between the one or more illuminators 570, 580 and the light guide 540. In some implementations, these surface features may be separate or discrete elements which have been coupled to the light guide 540. For example, a microlens array may be adhered to the light guide 540 to aid the optical coupling with an illuminator.

The one or more illuminators 570, 580 may be optically coupled to one of the edges of the light guide 540. In one implementation, the one or more illuminators 570, 580 may include a side-firing light emitting diode, with an emission side abutting the respective edge. The light guide panel 540 may be configured to distribute at least a portion of emitted light from the one or more illuminators 570, 580 to a front side of a display. This distribution of emitted light may frontlight or illuminate a display and the image presented thereon.

In FIG. 6, a first illuminator 622 may be optically coupled to a first side 620 of the light guide 600. The first side 620 may include an edge surface that is transverse to the first surface 610 of the light guide 600. The first side 620 may be transverse to a side or surface of the light guide 600 upon which a sensor is optically coupled. For example, if a top sensor was optically coupled to the first surface 610, the first side 620 would be transverse to both the top sensor and the first surface 610. A second illuminator 642 may be optically coupled to a second side 640 of the light guide 600. The second side 640 may be opposite the first side 620, or may not be opposite the first side. For example, the second side may be angled with respect to the first side in some embodiments. The light guide 600 may be configured to distribute at least a portion of light emitted from the first illuminator 622 and the second illuminator 642 to a front side of an electrophoretic display in one embodiment. A third illuminator 624 may also be positioned on the first side 620 of the light guide 600, and a fourth illuminator 644 and fifth illuminator 646 may be positioned on the second side 640 of the light guide 600. Any number of illuminators may be positioned at the light guide 600. The illuminators on the respective first side 620 and second side 640 of the light guide 600 may provide two-sided illumination, which may reduce interruption of light propagation through the light guide 600 during application of force at the light guide 600 or at a display stack that includes the light guide 600.

The first illuminator 622 may be positioned at a first location along the first side 620 of the light guide 600, and the second illuminator 642 may be positioned at a second location along the second side 640 of the light guide 600. The first illuminator 622 may be oriented such that a central light emission axis 626 of the first illuminator 622 is approximately aligned with an edge of the light guide 600, such that some of the emitted light propagates straight through, or directly through, the light guide 600 from the first side 620 to the second side 640. Similarly, the second illuminator 642 may be oriented such that a central light emission axis 654 is approximately aligned with an edge of the light guide 600, such that some of the emitted light propagates from the second side 640 to the first side 620.

As shown in FIG. 6, the second position at which the second illuminator 642 is positioned may be offset from a position on the second side 640 of the light guide 600 that is opposite or directly opposite the first position at which the first illuminator 622 is positioned, so as to form a staggered formation with the first illuminator 622. Specifically, the approximate position of the first illuminator 622 at the second side 640 may be approximated by determining an intersection of the central light emission axis 626 and the second side 640. The second illuminator 642 may be separated from that intersection by a distance 648, so as to create a staggered formation with respect to the first illuminator 642. Similarly, the fourth illuminator 644 may be spaced apart a distance 650 from the intersection, such that the first, second, and fourth illuminators 622, 642, 644 form a staggered formation with respect to each other. The distance 650 may be the same or different than the distance 648. The fifth illuminator 646 may be separated or spaced apart from the fourth illuminator 644 by a distance 652 that may be equal to or different than the sum of the distance 648 and the distance 650.

The third illuminator 624 may be positioned along the first side 620 of the light guide 620 so as to form a staggered formation with respect to at least one of the first illuminator 622, second illuminator 642, fourth illuminator 644, or fifth illuminator 646. The third illuminator 624 may be oriented to emit light at an emission angle 628 with a central light emission axis 630.

A user may apply a force or a pressure at a contact location 660. The light guide 600 may compress at the contact location 660 in response to the force or pressure applied by the user. In compressing, light emitted from the third illuminator 624 may be interrupted or otherwise redirected from its intended path of propagation, as illustrated by the arrows in FIG. 6. However, light propagating from the fourth illuminator 642 and the fifth illuminator 646 at the second side 640 may compensate for any interruption due to the pressure at the contact location 660. For example, light emitted from the fourth illuminator 642 may propagate through the light guide 600 along direction 656, and light emitted from the fifth illuminator 644 may propagate through the light guide 600 along direction 658, which may compensate for the interrupted light emitted from the third illuminator 624. Accordingly, embodiments of the disclosure may include staggered illuminators or two-sided illumination, or both. Some embodiments may include uniform offset values between opposite illuminators, while other embodiments may include non-uniform offset values.

Figure 7A:
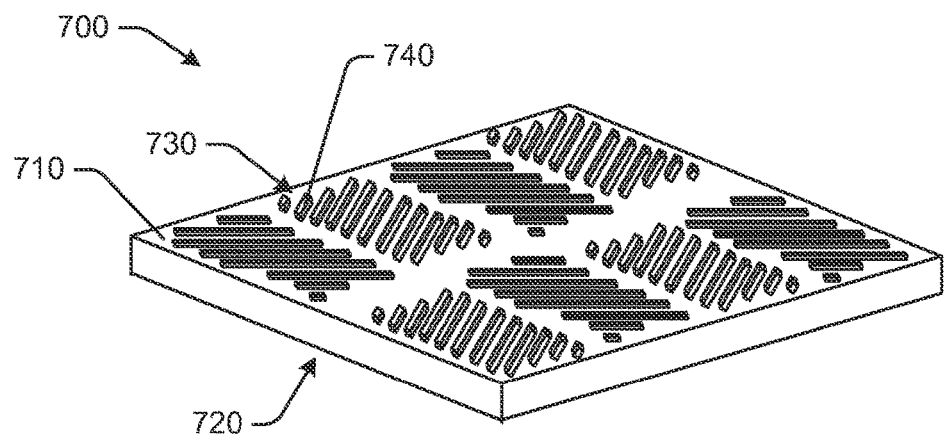
FIGS. 7A and 7B are schematic illustrations of example textured light guide surfaces in accordance with one or more embodiments of the disclosure.
Figure 7B:
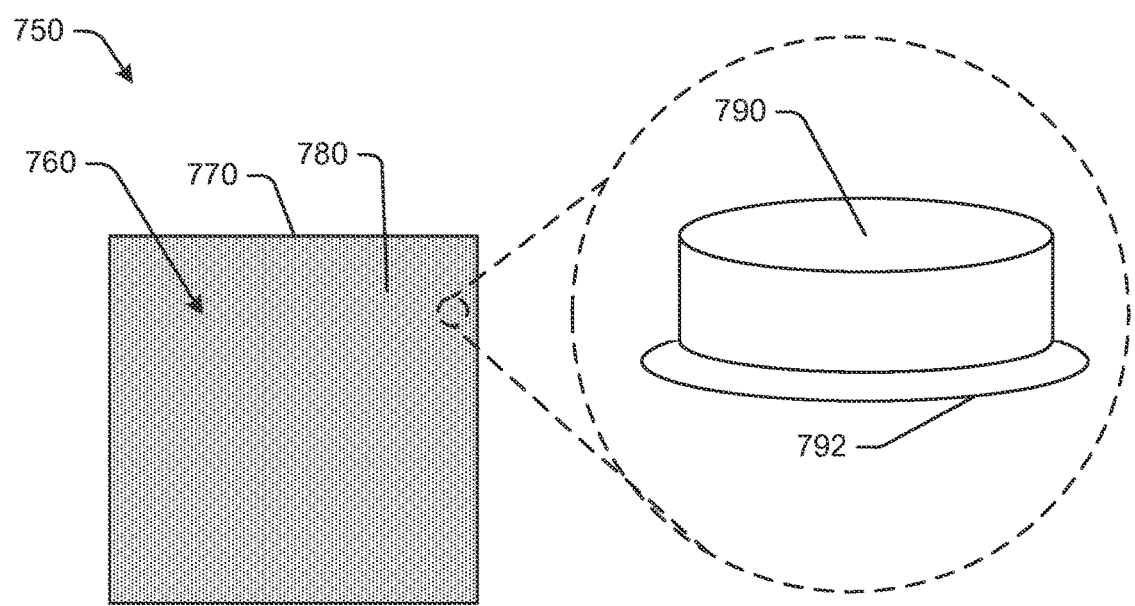

Referring to FIGS. 7A and 7B, example embodiments of a light guide with a textured surface is illustrated in accordance with one or more embodiments. In FIG. 7A, an example light guide 700 is depicted with a first surface 710, a second surface 720 opposite the first surface 710, and a textured surface portion 730 on the first surface 710. The textured surface portion 730 may cover a portion or all of the first surface 710. The light guide 700 may include any number of textured surface portions, as illustrated in FIG. 7A. The light guide 700 may be configured with the textured surface portion 730 having one or more surface features 740 on a surface thereof, or embedded within, which are configured to direct light along pre-determined paths. The surface features 740 may be diffractive, refractive, reflective, and so forth. The surface features 740 may include diffusers, grooves, grating, dimples, lenses, planar surfaces, concave surfaces, convex surfaces, patterning, engraving, and so forth, may be used to enhance or attenuate the transmission of light. In some implementations, optical features may be internal to the light guide 700 instead of, or in addition to, surface features 740. For example, regions with materials of differing indices of refraction may be used to form internal features to direct light within the light guide 700 or to interface points such as proximate to the one or more illuminators (shown in FIGS. 5-6), a display, and so forth. The light guide 700 may include one or more textured surface portions on the second surface 720 opposite the first surface 710, so as to further facilitate light transmission.

Textured surface portions 730 and/or surface features 740 may affect stray light or light streaking that may be visible to users. The surface features 740 may include raised portions that extend from a surface of the light guide 700. Raised portions may be in the form of rectangles, triangles, prisms, or other formations. The surface features 740 may include a series of identical or different sized parallel raised rectangular or box-like portions forming angled patterns. Some embodiments may include surface features 740 on both the first surface 710, as well as a portion of the opposing second surface 720. In such embodiments, the surface features may be the same, or may be different. For example, the top surface may have cylindrical surface features while the bottom surface may have rectangular surfaces. Other examples of surface features include blazed grating type patterns and standard prismatic type patterns.

The light guide 700 of FIG. 7A may be included in a display stack as described herein. The textured surface portion 730 of the light guide 700 may be positioned at an interface between a first sensor and the light guide 700 to facilitate optical coupling. As illustrated, the textured surface portion 730 may include a plurality of raised protrusions extending from the light guide 700. The textured surface portion 730 may be configured to facilitate optical coupling between the force sensitive capacitive sensor stack in which the light guide 700 is positioned and a cover film of the display stack. The textured surface portion 730 may include one or more of a diffuser, groove, grating, dimple, lens, planar surface, concave surface, or convex surface. The light guide 700 may be laminated or rubber compression molded, which may facilitate formation of the textured surface portions 730.

In FIG. 7B, a light guide 750 with a textured surface portion 760 covering the entire surface 770 of the light guide 750 with an example second surface feature 780 is illustrated. The second surface feature 780 may include a series of raised circular or cylindrical portions 790 spread across all of or a portion of the surface 770 of the light guide 750, for example, forming a desired pattern. The cylindrical portions 790 may extend from a rounded base 792 and may have varying or different radii.

Figure 8:
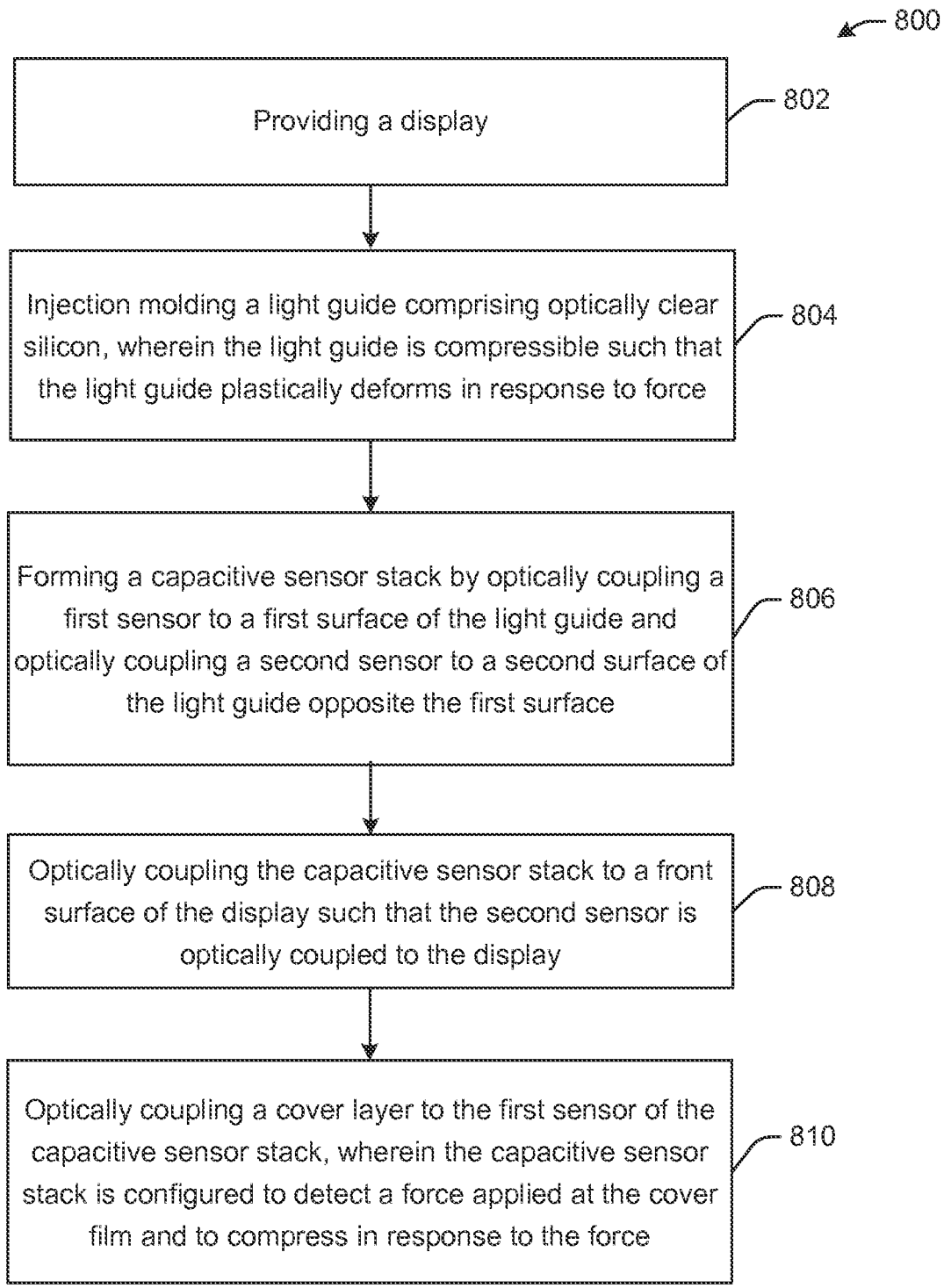
FIG. 8 is an example process flow in accordance with one or more example embodiments of the disclosure.

FIG. 8 illustrates a flow diagram of a process 800 of manufacturing a display stack as described herein. The following operations may be performed by manual, automated, or combined automated and manual operations.

At block 802, the process 800 includes providing a display. Block 804 includes injection molding a light guide comprising optically clear silicon, wherein the light guide is compressible such that the light guide plastically deforms in response to force. The capacitive sensor stack may include a first sensor optically coupled to the cover layer, a light guide optically coupled to the first sensor, where the light guide is optically clear and compressible, and a second sensor optically coupled to the display and to the light guide. Block 806 includes forming a capacitive sensor stack by optically coupling a first sensor to a first surface of the light guide and optically coupling a second sensor to a second surface of the light guide opposite the first surface. Block 808 includes optically coupling the capacitive sensor stack to a front surface of the display such that the second sensor is optically coupled to the display. Block 810 includes optically coupling a cover layer to the first sensor of the capacitive sensor stack, wherein the capacitive sensor stack is configured to detect a force applied at the cover film and to compress in response to the force.

In other embodiments, process 800 may include printing the first sensor on the light guide and printing the second sensor on the light guide. Process 800 may also include forming a textured surface on at least a portion of the light guide, the textured surface comprising one or more of a diffuser, groove, grating, dimple, lens, planar surface, concave surface, or convex surface. Process 800 may also include mounting a first illuminator to a first side of the light guide, and mounting a second illuminator to a second side of the light guide opposite the first side, such that the second illuminator is positioned opposite and offset from the first illuminator.

It should be noted, that the process 800 may be modified in various ways in accordance with certain embodiments of the disclosure. For example, one or more operations of process 800 may be eliminated or executed out of the illustrated order in other embodiments of the disclosure. Additionally, other operations may be added to process 800 in accordance with other embodiments of the disclosure.

Figure 9:
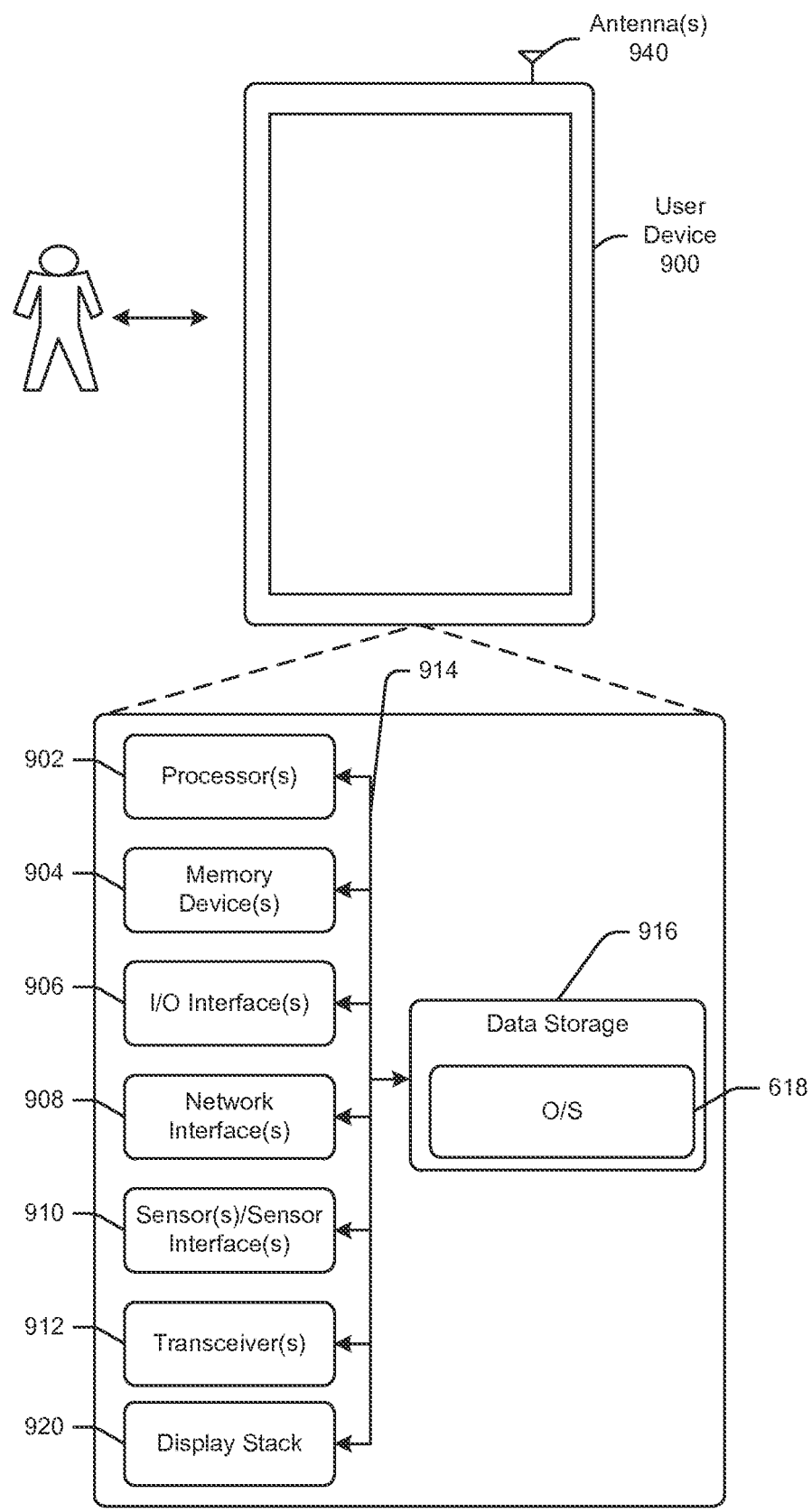
FIG. 9 is a schematic illustration of an example mobile device with a display stack in accordance with one or more example embodiments of the disclosure.

FIG. 9 is a schematic block diagram of an illustrative user device 900 in accordance with one or more example embodiments of the disclosure. The user device 900 may include any suitable computing device including, but not limited to, a mobile device such as a smartphone, tablet, e-reader, wearable device, or the like; a desktop computer; a laptop computer; a content streaming device; a set-top box; or the like.

The device 900 may be configured to communicate via one or more networks (not shown) with one or more servers, user devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 900 may include one or more processors (processor(s)) 902, one or more memory devices 904 (generically referred to herein as memory 904), one or more input/output ("I/O") interface(s) 906, one or more network interfaces 908, one or more sensors or sensor interfaces 910, one or more transceivers 912, one or more display stacks 920, and data storage 916. The device 900 may further include one or more buses 914 that functionally couple various components of the device 900. The device 900 may further include one or more antennas 940 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 914 may include at least one of a system bus, a memory bus, an address bus, or a message bus, and may permit exchange of information (e.g., data (including computer-executable code), signaling, etc.) between various components of the device 900. The bus(es) 914 may include, without limitation, a memory bus or a memory controller, a peripheral bus, an accelerated graphics port, and so forth. The bus(es) 914 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the device 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 916 may include removable storage and/or non-removable storage including, but not limited to, magnetic storage, optical disk storage, and/or tape storage. The data storage 916 may provide non-volatile storage of computer-executable instructions and other data. The memory 904 and the data storage 916, removable and/or non-removable, are examples of computer-readable storage media (CRSM) as that term is used herein.

The data storage 916 may store computer-executable code, instructions, or the like that may be loadable into the memory 904 and executable by the processor(s) 902 to cause the processor(s) 902 to perform or initiate various operations. The data storage 916 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 916 for non-volatile storage.

More specifically, the data storage 916 may store one or more operating systems (O/S) 918; one or more database management systems (DBMS); and one or more program modules, applications, or the like. Any of the program modules may include one or more sub-modules and may include computer-executable code, instructions, or the like that may be loaded into the memory 904 for execution by one or more of the processor(s) 902. Further, any data stored in the data storage 916 may be loaded into the memory 904 for use by the processor(s) 902 in executing computer-executable code. In addition, any data potentially stored in one or more datastores may be accessed via the DBMS and loaded in the memory 904 for use by the processor(s) 902 in executing computer-executable code.

The processor(s) 902 may be configured to access the memory 904 and execute computer-executable instructions loaded therein. For example, the processor(s) 902 may be configured to execute computer-executable instructions of the various program modules of the user device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

The display stack 920 may comprise any component as described herein, such as a cover layer, a capacitive sensor stack, a light guide, a display, liquid or tape optically clear adhesives, amongst other components. The display stack 920 as described herein may include compressive light guide layer and may further facilitate incorporation of a light guide into a capacitive sensor stack, which may reduce an overall thickness of the display stack 920 and/or the user device 900.

Referring now to other illustrative components depicted as being stored in the data storage 916, the O/S 918 may be loaded from the data storage 916 into the memory 904 and may provide an interface between other application software executing on the device 900 and hardware resources of the device 900. More specifically, the O/S 918 may include a set of computer-executable instructions for managing hardware resources of the device 900 and for providing common services to other application programs (e.g., managing memory allocation among various application programs). In certain example embodiments, the O/S 918 may control execution of the other program modules to dynamically enhance characters for content rendering. The O/S 918 may include any operating system now known or which may be developed in the future including, but not limited to, any server operating system, any mainframe operating system, or any other proprietary or non-proprietary operating system.

Referring now to other illustrative components of the device 900, one or more input/output (I/O) interfaces 906 may be provided that may facilitate the receipt of input information by the device 900 from one or more I/O devices as well as the output of information from the device 900 to the one or more I/O devices. The I/O devices may include, for example, one or more user interface devices that facilitate interaction between a user and the device 900 including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

The device 900 may further include one or more network interfaces 908 via which the device 900 may communicate with any of a variety of other systems, platforms, networks, devices, and so forth. Such communication may occur via any of the types of networks previously described.

The antenna(s) 940 may include any suitable type of antenna depending, for example, on the communications protocols used to transmit or receive signals via the antenna(s) 940. Non-limiting examples of suitable antennas may include directional antennas, non-directional antennas, dipole antennas, folded dipole antennas, patch antennas, multiple-input multiple-output (MIMO) antennas, or the like. The antenna(s) 940 may be communicatively coupled to one or more transceivers 912 or radio components to which or from which signals may be transmitted or received.

As previously described, the antenna(s) 940 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 940 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 90 GHZ channels (e.g. 802.11ad). In alternative example embodiments, the antenna(s) 940 may be configured to transmit or receive radio frequency signals within any suitable frequency range forming part of the unlicensed portion of the radio spectrum.

The antenna(s) 940 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(s) 940—transmitting or receiving radio frequency (RF) signals in the bandwidth and/or channels corresponding to the communications protocols utilized by the device 900 to communicate with other devices. The transceiver(s) 912 may include hardware, software, and/or firmware for modulating, transmitting, or receiving—potentially in cooperation with any of antenna(s) 940—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the device 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors (such as that included in the display stack 920), motion sensors, thermal sensors, cameras, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 9 as being stored in the data storage are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 900, and/or hosted on other computing device(s) accessible via one or more networks, may be provided to support functionality provided by the program modules, applications, or computer-executable code depicted in FIG. 9 and/or additional or alternate functionality. Further, functionality may be modularized differently such that processing described as being supported collectively by the collection of program modules depicted in FIG. 9 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 9 may be implemented, at least partially, in hardware and/or firmware across any number of devices.

It should further be appreciated that the device 900 may include alternate and/or additional hardware, software, or firmware components beyond those described or depicted without departing from the scope of the disclosure. More particularly, it should be appreciated that software, firmware, or hardware components depicted as forming part of the device 900 are merely illustrative and that some components may not be present or additional components may be provided in various embodiments. While various illustrative program modules have been depicted and described as software modules stored in data storage 916, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A display stack comprising:
   a cover film comprising a top surface exposed to an ambient environment and an opposing bottom surface;
   a display; and
   a force sensitive capacitive sensor stack positioned in between the cover film and the display, the force sensitive capacitive sensor stack comprising:
     a first clear sensor layer optically coupled to the bottom surface of the cover film with an optically clear adhesive;
     a translucent and compressible light guide layer comprising a first side optically coupled to the first clear sensor layer with the optically clear adhesive, the translucent and compressible light guide layer comprising optically clear silicon, wherein the light guide layer has a hardness value such that the light guide layer plastically deforms in response to force; and
     a second clear sensor layer optically coupled to the display and to a second side of the translucent and compressible light guide layer with the optically clear adhesive, the second side opposite the first side;
   wherein the force sensitive capacitive sensor stack is configured to detect an amount of force received at the cover film, and to compress in response to the force.

2. The display stack of claim 1, further comprising:
   a first illuminator positioned at a third side surface of the translucent and compressible light guide layer, the third side surface transverse to the first side and the second side, the first illuminator configured to direct light through the translucent and compressible light guide layer; and
   a second illuminator positioned at a fourth side surface of the translucent and compressible light guide layer opposite the third side surface, the second illuminator configured to direct light through the translucent and compressible light guide layer;
   wherein the second illuminator is positioned offset from the first illuminator such that the first illuminator and second illuminator are in a staggered formation.

3. The display stack of claim 1, wherein the translucent and compressible light guide layer further comprises a material dispersed within the optically clear silicon, wherein the material reflects light propagating through the translucent and compressible light guide layer.

4. The display stack of claim 1, wherein the first side of the translucent and compressible light guide layer comprises a textured surface portion that facilitates optical coupling between the force sensitive capacitive sensor stack and the cover film, the textured surface portion comprising a plurality of raised protrusions extending from the first side of the translucent and compressible light guide layer configured to increase a light propagation surface area between the cover film and the force sensitive capacitive sensor stack.

5. A device comprising:
   a cover layer;
   a display; and
   a capacitive sensor stack positioned in between the cover layer and the display, the capacitive sensor stack comprising:
     a first sensor optically coupled to the cover layer;
     a light guide optically coupled to the first sensor, wherein the light guide is compressible such that the light guide plastically deforms in response to force; and
     a second sensor optically coupled to the display and to the light guide;
   wherein the capacitive sensor stack is configured to detect a force received at the cover film and to compress in response to the force.

6. The device of claim 5, wherein the light guide is translucent or transparent and comprises one or more of optically clear silicon, optically clear thermoplastic elastomers, optically clear elastomers, or optically clear thermoplastic polyurethane.

7. The device of claim 5, wherein the capacitive sensor stack is a force sensitive capacitive sensor stack.

8. The device of claim 5, wherein the light guide has a durometer hardness value of greater than or equal to 20 shore A hardness and less than or equal to 80 shore A hardness.

9. The device of claim 5, further comprising:
   a first illuminator optically coupled to a first side of the light guide, wherein the first side is transverse to a second side of the light guide upon which the first sensor is optically coupled;
   a second illuminator optically coupled to a third side of the light guide opposite the first side;
   wherein the display is an electrophoretic display; and
   the light guide is configured to distribute at least a portion of light emitted from the first illuminator and the second illuminator to a front side of the electrophoretic display.

10. The device of claim 9, wherein:
    the first illuminator is positioned at a first location along the first side of the light guide; and
    the second illuminator is positioned at a second location along the third side of the light guide, the second position offset from a third position on the third surface that is opposite the first position.

11. The device of claim 5, further comprising a backlight coupled to the display, wherein the display is a liquid crystal display.

12. The device of claim 5, wherein the light guide comprises optically clear silicon and another material within the optically clear silicon, wherein the material reflects light propagating through the light guide.

13. The device of claim 5, further comprising a first textured surface portion at an interface between the first sensor and the light guide to facilitate optical coupling, the textured surface portion comprising a plurality of raised protrusions extending from the light guide.

14. The device of claim 13, further comprising a second textured surface portion opposite the first textured surface portion at an interface between the second sensor and the light guide, the first textured surface portion and the second textured surface portion comprising one or more of a diffuser, groove, grating, dimple, lens, planar surface, concave surface, or convex surface.

15. The device of claim 5, wherein the first sensor is printed directly on the light guide.

16. The device of claim 5, wherein the capacitive sensor stack comprises a dielectric optically clear adhesive positioned in between the first sensor and the second sensor, and the first sensor and the second sensor comprise capacitive electrodes.

17. A method of forming a display stack for an electronic device comprising:
providing a display;
injection molding a light guide comprising optically clear silicon, wherein the light guide is compressible such that the light guide plastically deforms in response to force;
forming a capacitive sensor stack by optically coupling a first sensor to a first surface of the light guide and optically coupling a second sensor to a second surface of the light guide opposite the first surface;
optically coupling the capacitive sensor stack to a front surface of the display such that the second sensor is optically coupled to the display; and
optically coupling a cover layer to the first sensor of the capacitive sensor stack;
wherein the capacitive sensor stack is configured to detect a force applied at the cover film and to compress in response to the force.

18. The method of claim 17, further comprising:
printing the first sensor on the first surface of the light guide; and
printing the second sensor on the second surface of the light guide opposite the first surface.

19. The method of claim 17, further comprising forming a textured surface on at least a portion of the light guide, the textured surface comprising one or more of a diffuser, groove, grating, dimple, lens, planar surface, concave surface, or convex surface via post pattern processing on the light guide.

20. The method of claim 17, further comprising:
mounting a first illuminator to a first side of the light guide; and
mounting a second illuminator to a second side of the light guide opposite the first side, such that the second illuminator is positioned opposite and offset from the first illuminator.

* * * * *